(12) United States Patent
Schaefer et al.

(10) Patent No.: US 8,395,356 B2
(45) Date of Patent: Mar. 12, 2013

(54) ELECTRIC FACILITY OPERATING ACCORDING TO GALVANIC PRINCIPLES, SUCH AS A LITHIUM-ION CELL, COMPRISING A CONTROL FOR THE OPERATING CONDITIONS

(75) Inventors: Tim Schaefer, Niedersachswerfen (DE); Andreas Gutsch, Luedinghausen (DE)

(73) Assignee: Li-Tec Battery GmbH, Kamenz (DE)

( * ) Notice: Subject to any disclaimer, the term of this patent is extended or adjusted under 35 U.S.C. 154(b) by 691 days.

(21) Appl. No.: 12/556,181

(22) Filed: Sep. 9, 2009

(65) Prior Publication Data
US 2010/0109611 A1 May 6, 2010

(30) Foreign Application Priority Data
Sep. 10, 2008 (DE) .......................... 10 2008 046 510

(51) Int. Cl.
*H02J 7/00* (2006.01)
(52) U.S. Cl. ...................................................... 320/134
(58) Field of Classification Search .................. 320/134, 320/136, 150, 153, 154
See application file for complete search history.

(56) References Cited

U.S. PATENT DOCUMENTS

| | | | |
|---|---|---|---|
| 5,830,599 A | 11/1998 | Okamoto et al. | |
| 6,222,346 B1 * | 4/2001 | Mori | 320/134 |
| 6,661,203 B2 * | 12/2003 | Wolin et al. | 320/134 |
| 6,919,725 B2 * | 7/2005 | Bertness et al. | 324/433 |
| 2006/0220620 A1 * | 10/2006 | Aradachi et al. | 320/150 |
| 2008/0030171 A1 | 2/2008 | Villefrance et al. | |
| 2009/0121685 A1 | 5/2009 | Eto | |

FOREIGN PATENT DOCUMENTS

| | | |
|---|---|---|
| EP | 0 773 596 A1 | 5/1997 |
| EP | 1 885 014 A2 | 2/2008 |
| EP | 2 003 762 A2 | 12/2008 |
| WO | 2007/122787 A1 | 11/2007 |

OTHER PUBLICATIONS

"A Guide to the Safe Use of Secondary Lithium Ion Batteries in Notebook-type Personal Computers", Japan Electronics and Information Technology Industries Association and Battery Association of Japan, Apr. 20, 2007, pp. 1-18.

* cited by examiner

*Primary Examiner* — Samuel Berhanu
(74) *Attorney, Agent, or Firm* — Abel Law Group, LLP (57) ABSTRACT

A facility which operates according to galvanic principles, such as in particular a lithium-ion accumulator, and a method for monitoring and controlling an electric operating condition of the facility. The facility comprises at least one galvanic cell and an operating management system for monitoring and controlling the electric operating condition of the facility and for monitoring a representative temperature of the facility. The operating management system is designed to control the electric operating condition of the facility as a function of the temperature. This Abstract is not intended to define the invention disclosed in the specification, nor intended to limit the scope of the invention in any way.

35 Claims, 3 Drawing Sheets

ELECTRIC FACILITY OPERATING ACCORDING TO GALVANIC PRINCIPLES, SUCH AS A LITHIUM-ION CELL, COMPRISING A CONTROL FOR THE OPERATING CONDITIONS

CROSS-REFERENCE TO RELATED APPLICATIONS

The present application claims priority under 35 U.S.C. §119 of German Patent Application No. 10 2008 046 510.0, filed Sep. 10, 2008, the entire disclosure of which is expressly incorporated by reference herein.

BACKGROUND OF THE INVENTION

1. Field of the Invention

The present invention relates to a facility operating according to galvanic principles such as a lithium-ion cell, respectively an accumulator comprising a plurality of such cells, wherein said facility is provided with an operating management system, and to a process for the control of the operating condition of the facility.

2. Discussion of Background Information

It is common practice to charge conventional lithium-ion cells, respectively accumulators, by means of a specific charging circuit, respectively charging electronic, only. A conventional charging circuit controls a charging-dependent charging current and may, for example, monitor the charging end voltage to be exactly kept.

Since integrated circuits have become respectively cheap, lithium-ion accumulators are operated more frequently in connection with an operating management system comprising an intelligent electronic circuit that considerably increases the safety during operation of said accumulators.

In practical use of lithium-ion accumulators, in particular such having a high capacity, it has proved that conventional measures, in particular for the operating control, are suboptimally developed with regard to requirements such as durability and safety of the cells, and that the dependency of type and variances in the individual cells as well as the use history and operating conditions in some cases have not sufficiently been taken into account. Thus, there is a need for finding new solutions in order to allow for operating lithium-ion accumulators in a more durable and safer manner.

It would be advantageous to be able to operate galvanic cells such as lithium-ion accumulators so that they are more durable.

It has been found that this goal can be achieved by a facility operating according to galvanic principles such as particularly an accumulator, for example a lithium-ion accumulator, which comprises at least one galvanic cell such as, for example, a lithium-ion cell, an operating management system for monitoring and controlling an electric operating condition of the facility as well as the monitoring of a temperature of the facility. According to the invention, the operating management system is designed to control the electric operating condition of the facility in dependence on the temperature. The mentioned electric operating condition may, in particular, be a charging current, respectively a discharging current, of the facility. By means of the temperature-dependent control of the electric operating condition, the facility, respectively an accumulator, respectively a cell of an accumulator, may be operated more durable and safer.

SUMMARY OF THE INVENTION

The present invention provides a facility that operates according to galvanic principles, such as in particular an accumulator, in particular a lithium-ion accumulator. The facility comprises at least one galvanic cell, in particular a lithium-ion cell, and an operating management system for monitoring and controlling the electric operating condition of the facility and for monitoring a representative temperature of the facility. The operating management system is developed (designed) to control the electric operating condition of the facility, for example a charging current and/or a discharging current of the facility, as a function of the temperature.

In one aspect of the facility, the electric operating condition of the facility may comprise the charging current and/or the discharging current of the facility.

In another aspect, the operating management system may be designed to control the electric operating condition of the facility in at least two different temperature intervals by means of temperature dependencies which are different from each other.

In another aspect of the facility, the operating management system may be designed to record the temperature of the facility.

In yet another aspect, the facility may comprise at least one temperature measurement unit for measuring a temperature of the facility.

In another aspect, the temperature of the facility may be a temperature that is representative for the temperature of a cathode and/or an anode and/or an electrolyte which is in electrochemical operative connection with the cathode and/or the anode.

In another aspect, the representative temperature of the cathode and/or the anode may be a temperature which is representative for the temperature of the current conductor of the cathode and/or the current conductor of the anode.

In a still further aspect, the representative temperature of the cathode and/or the anode may be a temperature which is representative for the temperature of the active layer of the cathode and/or the active layer of the anode.

In another aspect, a temperature sensor of the temperature measurement unit may be arranged in heat-conducting communication with the current conductor of the cathode and/or the current conductor of the anode and/or the electrolyte.

In another aspect, the operating management system may be designed for controlling the electric operating condition of the facility also as a function of a representative parameter which is determined by the operating management system for a charging condition and/or a health condition of the facility, in particular the galvanic cells of the facility.

In another aspect, the facility may comprise two, three, in particular four or more galvanic cells, in particular lithium-ion cells.

In another aspect, the facility may comprise two, three, in particular four or more galvanic cells, in particular lithium-ion cells, and with regard to a respective cell at least one temperature measurement unit. For example, a respective temperature measurement unit may be designed to measure a temperature which is representative for the temperature of the respective cell.

In yet another aspect of the facility, a set charging current and/or a set discharging current that is predetermined in particular for the type of facility, may be assigned to the respective temperature interval.

In another aspect, the facility may have a lower temperature threshold ($T_{uGr}$) and/or an upper temperature threshold ($T_{oGr}$) and the operating management system may be designed to effect that the facility cannot be operated, for example, the at least one galvanic cell cannot be charged and/or discharged, if a temperature of the at least one galvanic cell is below the lower temperature threshold ($T_{uGr}$) or above the upper temperature threshold ($T_{oGr}$).

In yet another aspect, the facility may have a first temperature threshold (T1), a second temperature threshold (T2) which is greater than or equal to the first temperature threshold (T1), a third temperature threshold (T3) which is greater than or equal to the second temperature threshold (T2), and a fourth temperature threshold (T4) which is greater than or equal to the third temperature threshold (T3), and the operating management system may be designed:

- to limit the charging and/or discharging set current of the at least one galvanic cell within the temperature interval between the second and third temperature threshold (T2, T3) to a maximum charging current value and/or discharging current value ($I_{max}$),
- to limit the charging and/or discharging set current of the at least one galvanic cell within the temperature interval between the first and second temperature threshold (T1, T2) to a first charging current value and/or discharging current value ($I_1$), which is less than the maximum charging and/or discharging current value ($I_{max}$) within the temperature interval between the second and third temperature threshold (T2, T3) (so that, in particular, $I_1 \leq x1 \cdot I_{max}$ and $0 < x1 < 100\%$),
- to limit the charging and/or discharging set current of the at least one galvanic cell within the temperature interval between the third and fourth temperature threshold (T3, T4) to a second charging and/or discharging current value ($I_2$), which also is less than the maximum charging and/or discharging current value ($I_{max}$) within the temperature interval between the second and third temperature threshold (T2, T3) (so that, in particular, $I_2 \leq x2 \cdot I_{max}$ and $0 < x2 < 100\%$).

In another aspect of the facility, the operating management system may be designed:

- to limit the charging and/or discharging set value of the at least one galvanic cell within the temperature interval between the third and fourth temperature threshold (T3, T4) to a third, minimal charging and/or discharging current value ($I_3$), so that the charging and/or discharging current within said temperature interval is not less than the minimal charging and/or discharging current value ($I_3$) and not greater than the said second maximum charging and/or discharging current value ($I_2$) (so that, in particular, $I_3 \geq x3 \cdot I_{max}$ and $0 < x3 < x2$).

In yet another aspect, the facility may comprise a fifth temperature threshold (T5) that is greater or equal to the fourth temperature threshold (T4), and the operating management system may be designed to limit the charging and/or discharging set current ($I_4$) of the at least one galvanic cell within the temperature interval between the fourth and fifth temperature threshold (T4, T5) to a fourth charging and/or discharging current ($I_4$), which is less than the second charging and/or discharging current ($I_2$) within the temperature interval between the third and fourth temperature threshold (T3, T4).

In another aspect, the parameter x1 may not be greater than about 90% and not less than about 30%, and may in particular be selected from a group comprising the values of essentially 90%, 80%, 70%, 60%, 40% or 30% and/or the parameter pair (x3, x2) may be selected from a group comprising the parameter pairs of essentially (90%, 10%), (90%, 20%), (90%, 30%), (90%, 40%), (80%, 10%), (80%, 20%), (80%, 30%) or (80%, 40%).

In a still further aspect of the facility of the present invention, the operating management system may be designed to regulate the charging and/or discharging set current of the at least one galvanic cell to an interim value that is between the charging and/or discharging set value below a temperature threshold (Tx with x=1, 2, 3, 4 or 5) and the charging and/or discharging set value above the temperature threshold (Tx) if the temperature within a temperature transition interval having a first temperature width ($\delta 1$), which adjoins the temperature threshold (Tx) below, wherein in particular the temperature width ($\delta 1$) may not be greater than the width of a temperature interval extending from the temperature threshold (Tx) to lower temperatures and/or the operating management system may be designed to regulate the charging and/or discharging set current of the at least one galvanic cell to an interim value that is between the charging and/or discharging set value above a temperature threshold (Tx with x=1, 2, 3, 4 or 5) and the charging and/or discharging set current below the temperature threshold (Tx) if the temperature in a temperature transition interval (84-2) having a second temperature width ($\delta 2$) which adjoins the temperature threshold (Tx) above, wherein in particular the temperature width ($\delta 2$) may not be greater than the width of a temperature interval extending from the temperature threshold (Tx) to higher temperatures. Further, the operating management system may additionally be designed to regulate the charging and/or discharging set value to at least two different interim values if the temperature is within a temperature transition interval. Even further, the operating management system may be developed to regulate the charging and/or discharging set current as a function of the temperature continuously between the charging and/or discharging set current within the temperature interval below the respective temperature threshold (Tx) and the charging and/or discharging set current above the respective temperature threshold (Tx) if the temperature is within a temperature transition interval.

In another aspect of the facility, the lower temperature threshold ($T_{uGr}$) and/or the first temperature threshold (T1) may be selected from the interval of from about 5° C. to about 15° C., preferably from the interval of from about 7° C. to about 13° C., or the interval of from 9° C. to about 11° C., and still more preferred about 10° C.

In another aspect, a first temperature threshold that is selected from the lower temperature threshold ($T_{uGr}$), the first temperature threshold (T1), the second temperature threshold (T2), the third temperature threshold (T3), the fourth temperature threshold (T4), the fifth temperature threshold (T5) and the upper temperature threshold ($T_{oGr}$) may be a temperature threshold for a first representative temperature, for example a temperature of the electrolyte, and a second temperature threshold which is different from the first temperature threshold and may be selected from the lower temperature threshold ($T_{uGr}$), the first temperature threshold (T1), the second temperature threshold (T2), the third temperature threshold (T3), the fourth temperature threshold (T4), the fifth temperature threshold (T5), and the upper temperature threshold ($T_{oGr}$) is a temperature threshold for a second representative temperature which is different from the first representative temperature, for example a temperature of one of the electrodes.

The present invention also provides a method for monitoring and controlling an electric operating condition of a facility that operates according to galvanic principles and comprises at least one galvanic cell, in particular a lithium-ion cell. The method comprises:

(1) monitoring an electric operating condition of the facility,
(2) monitoring a temperature of the facility, and (3) controlling the electric operating condition of the facility, in particular a charging current and/or discharging current of the at least one cell, as a function of the temperature.

In one aspect of the method, (3) may comprise controlling the electric operating condition of the facility in at least two different temperature intervals by means of temperature dependencies which are different from each other.

In another aspect, (1) may comprise recording the temperature of the facility, in particular by using a temperature measurement unit for measuring a temperature of the facility.

In yet another aspect of the method, (3) may comprise controlling the electric operating condition of the facility also as a function of a representative parameter which is determined by an operating management system for a charging condition and/or a health condition of the facility, in particular the galvanic cells of the facility.

In another aspect of the method of the present invention, (3) may comprise:
defining a lower temperature threshold ($T_{uGr}$) and/or an upper temperature threshold ($T_{oGr}$),
effecting that the facility is not operated, in particular that the at least one galvanic cell is not charged and/or discharged, if a temperature of the at least one galvanic cell is below the lower temperature threshold ($T_{uGr}$) or above the upper temperature threshold ($T_{oGr}$).

In another aspect, (3) may comprise:
defining a first temperature threshold (T1), a second temperature threshold (T2) that is greater than or equal to the first temperature threshold (T1), a third temperature threshold (T3) that is greater than or equal to the second temperature threshold (T2), and a fourth temperature threshold (T4) that is greater than or equal to the third temperature threshold (T3),
limiting the charging and/or discharging set value of the at least one galvanic cell within the temperature interval between the second and third temperature threshold (T2, T3) to a maximum charging and/or discharging current value ($I_{max}$),
limiting the charging and/or discharging set value of the at least one galvanic cell within the temperature interval between the first and second temperature threshold (T1, T2) to a first charging and/or discharging current value ($I_1$) that is less than the maximum charging and/or discharging current value ($I_{max}$) within the temperature interval between the second and third temperature threshold (T2, T3),
limiting the charging and/or discharging set value of the at least one galvanic cell within the temperature interval between the third and fourth temperature threshold (T3, T4) to a second charging and/or discharging current value ($I_2$) that is also less than the maximum charging and/or discharging current value ($I_{max}$) within the temperature interval between the second and third temperature threshold (T2, T3).

In yet another aspect, (3) may further comprise:
limiting the charging and/or discharging set current of the at least one galvanic cell within the temperature interval between the third and fourth temperature threshold (T3, T4) to a third, minimal charging and/or discharging current value ($I_3$) such that the charging and/or current within this temperature interval is not less than the minimal charging and/or discharging current value ($I_3$) and not greater than the said second maximum charging and/or discharging current value ($I_2$).

In a still further aspect of the method, (3) may further comprise:
defining a fifth temperature threshold (T5) that is greater than or equal to the fourth temperature threshold (T4),
limiting the charging and/or discharging set current of the at least one galvanic cell within the temperature interval between the fourth and fifth temperature threshold (T4, T5) to a fourth charging and/or discharging current value ($I_4$) that is less than the second charging and/or discharging set value ($I_2$) within the temperature interval between the third and fourth temperature threshold (T3, T4).

In another aspect, (3) may further comprise:
regulating the charging and/or discharging set value of the at least one galvanic cell to an interim value that is between the charging and/or discharging set value below a temperature threshold (Tx with x=1, 2, 3, 4, or 5) and the charging and/or discharging set current above the temperature threshold (Tx) if the temperature in a temperature transition interval having a first temperature width ($\delta 1$) which adjoins the temperature threshold (Tx) below, wherein in particular the temperature width ($\delta 1$) may be not greater than the width of a temperature interval extending from the temperature threshold (Tx) to lower temperatures, and/or
regulating the charging and/or discharging set current of the at least one galvanic cell to an interim value that is between the charging and/or discharging set current above a temperature threshold (Tx with x=1, 2, 3, 4, or 5) and the charging and/or discharging set current below the temperature threshold (Tx) if the temperature within a temperature transition interval (84-2) having a second temperature width ($\delta 2$) which adjoins the temperature threshold (Tx) above, wherein in particular the temperature width $\delta 2$ may not be greater than the width of a temperature interval extending from the temperature threshold (Tx) to higher temperatures.

In a further aspect of the method, (3) may further comprise:
regulating the charging and/or discharging set current as a function of the temperature continuously between the charging and/or discharging set current value within the temperature interval below the respective temperature threshold (Tx) and the charging and/or discharging set current value above the respective temperature threshold (Tx) if the temperature is within a temperature transition interval.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A facility operating according to galvanic principles is a facility that comprises a least a so-called galvanic cell, wherein the galvanic cell comprises at least a first and a second facility for the storage of electrically different charges as well as means for generating an electric operative connection of the two charge storage facilities, and wherein charge carriers may be moved between those two mentioned facilities. The means for generating an electric operative connection is, for example, an electrolyte, which functions as ion conductor.

An operating management system is a system for monitoring and controlling an electric operating condition of the facility operating according to galvanic principles, which monitors the electric operating condition of the facility that may be described by means of certain selected function parameters of the facility, and controls said electric operating condition in dependence on the usage conditions of the facility. The control may thereby particularly refer to a charging, respectively discharging process of the facility, in particular of the at least one galvanic cell.

The mentioned function parameters describing the electric operating condition of the facility are such physical factors, which may serve for the description of the condition of a galvanic cell. Such parameters comprise, for example, the electric capacity of a galvanic cell, the measurable voltage between the both terminals of the cell, which, in particular, may be measured during the open-circuit operation or as load-dependent terminal voltage, the magnitude of an electric current leading to the charge or discharge of the cell, the internal resistance of a galvanic cell with which the cell, as a rule, such as every technical voltage source is afflicted, an already charged or available electric charge of the galvanic cell, leakage currents between the terminals within the galvanic cell, or also a temperature of the cell, which is measured at representative locations, respectively elements of the cell, or, due to practical reasons, possibly is only measured from the exterior of the cell. Depending on the requirements during the operation of the galvanic cell as a rechargeable cell, still other physical factors or factors derived therefrom may be of interest, such as, for example, a so-called state of charge (SOC) that is known to the person skilled in the art, or state of health (SOH), which take into account the use history, in particular the charging, respectively discharging history of the cell.

For the operation of the facility, in particular a range of acceptable operating temperatures may be defined, which is divided into at least two temperature intervals, wherein in the at least two temperature intervals the electric operating condition of the facility is controlled according to different temperature dependencies. A temperature interval may be thereby defined that said interval is defined by indicating a lower interval limit ("greater than . . . "), an upper interval limit ("less than . . . ") or by indication of a lower and an upper interval limit ("from . . . to . . . "). By means of such variably selectable temperature intervals and different temperature dependencies defined therein for the control of the electric operating condition by means of particular function parameters of the facility, the operating management system may be adapted to different types of galvanic cells for an optimized control, and thus may be developed to be variably used.

The operating management system can thereby be developed such to record and to monitor a temperature of the facility and, in particular, also the time dependent course thereof. For this, preferably, the facility, in particular the operating management system, comprises at least one temperature measurement unit for measuring a temperature of the facility, which comprises at least one sensor, at least one associated sensor transferring signal means, and at least one signal analyzing unit. Thus, the facility is not dependent on external temperature measurement units.

Preferably, the mentioned temperature of the facility is a temperature that is representative for an electrode, in particular a cathode, respectively anode, and/or the means for the generation of the electric operative connection between the electrodes, in particular an electrolyte that is in electrochemical operative connection with a cathode, respectively an anode. Such a representative temperature characterizes in a suitable manner the functional elements of the galvanic cell in which, due to the electric operation, thermal energy is generated. The representative temperature of the cathode, respectively the anode, may be a temperature being representative for the current conductor of the cathode, respectively the current conductor of the anode. The selection of a current conductor as an element the temperature of which is measured as representative temperature of the facility, respectively cell, for the control of the electric operating condition thereof, has the advantage that a current conductor, in particular at its outer end, that is the end being outside of a housing of the cell, is easily accessible for a temperature measurement.

Alternatively or additionally, the representative temperature of the cathode, respectively anode, may be a temperature that is a representative temperature for the active layer of the cathode, respectively the active layer of the anode. Due to the selection of the active layer of the cathode, respectively anode, as representative temperature, one obtains a temperature for the portion of the cell where the electrochemical processes take place, and where during the operation thermal energy is primarily generated, which facilitates a particularly representative temperature value characterizing the electric operating condition of the facility as basis for the operating management system for the control of the electric operating condition of the facility.

The facility may comprise at least one or more temperature measurement units for measuring one or more representative temperatures of the facility, in particular of the at least one galvanic cell.

The facility may also comprise two, three, in particular also four or more galvanic cells, in particular lithium-ion cells, which may be connected in serial connection and/or parallel connection. By means of a serial connection of the cells, an increase of the voltage, respectively an approach to an electric supply voltage needed by an application is facilitated. A parallel connection of cells increases the capacity of the facility.

The operating management system may be developed such to operate the facility in a manner that at least two galvanic cells may be operated with each other in the so-called cell balancing.

If the facility comprises two, three, in particular also four or more galvanic cells, it preferably comprises further at least one or more temperature measurement units for a respective cell. This allows a cell-specific recording of the temperature as basis for the control of the electric operating condition of the facility, in particular the electric operating condition of a respective galvanic cell. For this, a respective temperature measurement unit is preferably developed such to measure a representative temperature for the respective cell.

For the control of the electric operating condition of the facility in at least two different temperature intervals by using temperature dependencies being different of each other, a set charging current, respectively set discharging current being particularly predetermined for the type of facility, may be attributed to a respective temperature interval. Practical experiences prove that, in particular, a temperature-dependent regulation of the charging, respectively discharging current facilitates very good results in the improvement of the durability of the galvanic cell, in particular lithium-ion cell.

The facility may exhibit a lower temperature threshold, respectively upper temperature threshold, which are predetermined for the facility and/or may be adapted during operation. Thereby, the operating management system may be developed such to effect that the facility is not operated, in particular the at least one galvanic cell is not charged, respectively discharged, if a representative temperature of the at least one galvanic cell is below the lower temperature threshold, respectively above the upper temperature threshold. Such a control increases the operating safety, in particular the introduction of an upper limit of the temperature as described decreases the risk of a thermal damage, in particular decreases the destruction process of a cell that is known to the person skilled in the art under the term "thermal runaway".

In an advantageous embodiment of the temperature-dependent control of the electric operating parameters, the facility may have a first temperature threshold, a second temperature threshold that is greater than or equal to the first temperature threshold and defines together with the first temperature threshold a first temperature interval, a third temperature threshold that is greater than or equal to the second temperature threshold and defines together with the second temperature threshold a second temperature interval, and a fourth temperature threshold that is greater than or equal to the third temperature threshold and defines together with the third temperature threshold a third temperature interval. Thereby, in particular, the first up to the fourth temperature threshold is predetermined for the facility, in particular is predetermined for the at least one galvanic cell, and/or is adapted during the operation of the facility. In this embodiment of the control, the system for the operating management may be developed to the following:

to limit the charging current, respectively discharging current of the at least one galvanic cell within the second temperature interval between the second and third temperature threshold to a maximum charging current, respectively discharging current ($I_{max}$), to limit the charging current, respectively discharging current of the at least one galvanic cell in the first temperature interval between the first and second temperature threshold to a first charging current value, respectively discharging current value ($I_1$), which is less than the maximum charging, respectively discharging current value, within the second temperature interval (i.e., in particular, $I_1 \leq x_1 \cdot I_{max}$ and $0 < x_1 < 100\%$), to limit the charging current, respectively discharging current of the at least one galvanic cell within the third temperature interval between the third and fourth temperature interval to a second charging, respectively discharging current set-value ($I_2$), which also is less than the maximum charging, respectively discharging current value, within the second temperature interval (i.e., in particular, $I_2 \leq x_2 \cdot I_{max}$ and $0 < x_2 < 100\%$).

The provision of three temperature intervals with different regulation instructions for the charging, respectively discharging current, respectively, allows a really good adaptation of the operating management system to different cell types, and a technically particularly simple implementation, respectively programming, of an algorithm of the operating management system for regulating the electric operating condition of the facility.

In the before-mentioned embodiment having three temperature intervals, the operating management system may be developed such to limit the charging current, respectively discharging current of the at least one galvanic cell within the temperature interval between the third and fourth temperature threshold to a minimal charging, respectively discharging current value ($I_3$) such that the charging, respectively discharging current within this temperature interval is not less than the minimal charging, respectively discharging current value ($I_3$), and not greater than the said second maximum charging, respectively discharging current value ($I_2$) (i.e., in particular, $I_3 \geq x_3 \cdot I_{max}$ and $0 < x_3 < x_2 < 100\%$). In a similar manner, the operating management system may also be developed such to limit the charging current, respectively discharging current of the at least one galvanic cell within the temperature interval between the first and second temperature threshold to a minimal charging, respectively discharging current set value ($I_3'$) such that the charging, respectively discharging current in this temperature interval is not less than the minimal charging, respectively discharging current value ($I_3'$), and is not greater than the said first charging, respectively discharging current value ($I_1$) (i.e., in particular, $I_3' \geq x_3' \cdot I_{max}$ and $0 < x_3' < x_1 < 100\%$). In this manner, in the respective temperature intervals, a control range for the charging, respectively discharging current, between the third, minimal and the second, maximum charging, respectively discharging current value, is predetermined, and the control range is limited upturn and downward in order to increase the safety and durability.

For refining the adaptation of the control algorithm, respectively the control, by means of the operating management system to different types of accumulators, the facility may also have a fifth temperature threshold that is greater than or equal to the fourth temperature threshold, and defines together with the fourth temperature threshold a fourth temperature interval. Thereby, the operating management system is developed such to limit the charging, respectively discharging set current of the at least one galvanic cell within the temperature interval between the fourth and the fifth temperature threshold to a fourth charging, respectively discharging current ($I_4$), which is less than the maximum charging, respectively discharging current ($I_{max}$) within the second temperature interval between the third and fourth temperature threshold. Alternatively to the fifth temperature threshold or additionally thereto, also another, sixth temperature threshold may be defined that is less than or equal to the first temperature threshold, and which defines together with the first temperature threshold a fifth temperature interval. Thereby, the operating management system is developed such to limit the charging, respectively discharging set current of the at least one galvanic cell within the temperature range between the sixth and the first temperature threshold to a fifth charging, respectively discharging current ($I_5$), which is less than the charging, respectively discharging current ($I_1$) within the first temperature interval between the first and second temperature threshold. The provision of a fourth, respectively fifth temperature interval allows a further refining of the adaptation of the control of the electric operating condition of the facility to different types of accumulators.

For the protection of the electrodes, in particular prior to the switches in the control value for the charging, respectively discharging current, which occurs at the temperature thresholds ($T_x$) with x=1, 2, . . . 6), respectively switch-over points, the operating management system may be developed such to regulate the charging, respectively discharging current of the at least one galvanic cell to an interim value, whereby said interim value is between the charging, respectively discharging set current below the temperature threshold, and the charging, respectively discharging set current above the temperature threshold, if the temperature is within a temperature transition interval. The temperature transition interval may adjoinedly extend below the temperature threshold ($T_x$ with x=1, 2, . . . 6), and may provide a first temperature width ($\delta 1$) such that the temperature transition interval extends from $T_x-\delta 1$ to $T_x$. Thereby, the first temperature width ($\delta 1$) may be less than the width of the respective temperature interval extending below the temperature threshold ($T_x$). Accordingly, the operating management system may also be developed such to regulate the charging, respectively discharging current of the at least one galvanic cell to an interim value, if the temperature is within a temperature transition interval that in particular adjoinedly extends above the temperature threshold, and has a second temperature width ($\delta 2$), i.e. if the temperature is within the temperature interval of from Tx to $T_x+\delta 2$. Thereby, the second temperature width may be less than the width of the interval adjoinedly extending above this temperature threshold to this temperature threshold.

The addition of the interim value for the charging, respectively discharging set current, within the temperature transition interval adjoining said temperature threshold, effects a less strongly developed switch of the control current value, and thus a continuous transition of the controlled charging, respectively discharging, if the temperature changes above the temperature threshold, and thus effects an operation of the electrodes within the galvanic cell, in particular of the anodes of a lithium-ion cell, which is more limiting the risk of damage.

A still better protection can be achieved thereby by developing the operating management system such to regulate the charging, respectively discharging set current to at least two different interim values, or better according to a staircase-shaped set value curve as function of the temperature, if the temperature is within a temperature transition interval. It may be still more preferred with respect to the protection of the electrodes to develop the operating management system such to regulate the charging, respectively discharging current continuously in dependence on the temperature between the charging, respectively discharging set current, within the temperature interval below the respective temperature threshold, and the charging, respectively discharging set current above the respective temperature threshold, if the temperature is within a temperature transition interval. A continuous regulation of the temperature may be described by a linear, or in a graphic view S-shaped, left-curved or right-curved temperature dependence of the charging, respectively discharging set current as function of the temperature.

The lower temperature threshold, respectively the first temperature threshold below of which the charging, respectively discharging set value is regulated to a value of essentially zero, respectively below of which the facility cannot be operated, may be from the interval of from about 5° C. to about 15° C., preferred from the interval of from about 7° C. to about 13° C., still more preferred from the interval of from about 9° C. to about 11° C., still more preferred be essentially about 10° C. The preferred selection of the lower temperature threshold occurs in dependence on and for the adaptation to the type of the galvanic cell.

It may be advantageous that a first temperature threshold that is selected from a group comprising the lower temperature threshold, the first temperature threshold, the second temperature threshold, the third temperature threshold, the fourth temperature threshold, the fifth temperature threshold, the sixth temperature threshold and the upper temperature threshold, a temperature threshold for a first representative temperature of the facility, for example a temperature of the electrolyte, and that a second temperature threshold being different from the first temperature threshold that is selected from the group comprising the lower temperature threshold and the first temperature threshold, the second temperature threshold, the third temperature threshold, the fourth temperature threshold, the fifth temperature threshold, the sixth temperature threshold and the upper temperature threshold, is a temperature threshold for a second representative temperature being different from the first temperature, for example a temperature of one of the electrodes. By means of the adaptation of the representative temperature, in particular for example the measurement position for the measurement of the representative temperature at the use of the temperature threshold, for example as lower limit and/or as upper limit of a temperature interval, the regulation accuracy, respectively the regulation reliability, can be increased.

For example, a first representative temperature which, for example, is used as a first lower temperature threshold within a regulation algorithm for the electric operating condition, a temperature at a location, respectively at an element of the facility, where the temperature is expectedly relatively low, in particular lower than an averaged temperature of the facility, and a second temperature threshold, which, for example, is used as an upper limit of a temperature interval within the regulation algorithm, and is measured at a location, respectively at an element of the facility, where the temperature is expectedly relatively high during operation, in particular higher than an averaged temperature of the facility. Then, the lower, respectively the upper regulation range limit, is detected at an earlier stage during increasing, respectively decreasing temperature as compared to a temperature threshold being defined by means of an averaged temperature of the facility.

In a further aspect of the invention there is provided a method for the monitoring and controlling of an electric operating condition of a facility operating according to galvanic principles, comprising at least one galvanic cell, in particular a lithium-ion cell, wherein the method comprises the following steps:

(1) monitoring an electric operating condition of the facility,
(2) monitoring a temperature of the facility, and
(3) controlling the electric operating condition of the facility, in particular a charging current, respectively discharging current of the at least one cell in dependence on the temperature.

In turn, some of the before-mentioned embodiments of the regulation algorithm of the operating management system for the temperature-dependent control of the electric operating condition are in accordance with said method and with advantageous embodiments of said method that are described in the following. Therefore, the advantages already mentioned above, respectively the effects, are not reiterated in the following.

In the method, step (3) may comprise the control of the electric operating condition of the facility in at least two different temperature intervals by means of temperature dependencies that are different of each other.

In the method, step (1) may comprise a step of recording the temperature of the facility, in particular by using a temperature measurement unit for measuring a temperature of the facility.

Step (3) of the method may further comprise the control of the electric operating condition of the facility in dependence on a parameter that is representative for a charging condition, respectively a health condition of the facility, in particular of the galvanic cells of the facility, which is communicated by an operating management system.

Step (3) of the method may further comprise the following:
defining a lower temperature threshold, respectively an upper temperature threshold,
effecting that the facility is not operated, in particular that the at least one galvanic cell is not charged, respectively discharged, if a temperature of the at least one galvanic cell is below the lower temperature threshold, respectively above the upper temperature threshold.

Step (3) may further comprise the following:
defining a first temperature interval, a second temperature interval that is greater than the first temperature threshold, a third temperature threshold that is greater than the second temperature threshold, and a fourth temperature threshold that is greater than the third temperature threshold,
limiting the charging, respectively discharging current of the at least one galvanic cell within the second temperature interval between the second and third temperature interval to a maximum charging, respectively discharging current value ($I_{max}$),
limiting the charging, respectively discharging set current of the at least one galvanic cell within the first temperature interval between the first and second temperature threshold to a first charging, respectively discharging current value ($I_1$) that is less than the maximum charging, respectively discharging current value within the second temperature interval (i.e., in particular, $I_1 \leq x_1 \cdot I_{max}$ and $0 < x_1 < 100\%$),
limiting the charging, respectively discharging set current of the at least one galvanic cell within the third temperature interval between the third and fourth temperature threshold to a second charging, respectively discharging current value ($I_2$) that is also less than the maximum charging, respectively discharging current value within the second temperature interval (i.e., in particular, $I_2 \leq x_2 \cdot I_{max}$ and $0 < x_2 < 100\%$).

In this embodiment, step (3) may further comprise:
limiting the charging, respectively discharging set current of the at least one galvanic cell within the temperature interval between the third and fourth temperature threshold to a third, minimal charging, respectively discharging current value ($I_3$),
such that the charging, respectively discharging current in this temperature interval is not less than the minimal charging, respectively discharging current value ($I_3$), and not greater than the said second maximum charging, respectively discharging current value ($I_2$) (i.e., in particular, $x_3 \cdot I_{max} \leq I_3 \leq x_2 \cdot I_{max}$ and $0 < x_3 < x_2 < 100\%$).

In this embodiment, step (3) may further comprise:
defining a fifth temperature threshold that is greater than or equal to the fourth temperature threshold and that defines with the latter a fourth temperature interval,
limiting the charging, respectively discharging set current of the at least one galvanic cell within the fourth temperature interval between the fourth and fifth temperature threshold to a fourth charging, respectively discharging current value ($I_4$) that is less than the second charging, respectively discharging set current ($I_2$) in the third temperature interval between the third and fourth temperature threshold.

Within these embodiments including definitions of temperature thresholds, step (3) may further comprise:
regulating the charging, respectively discharging set current of the at least one galvanic cell to an interim value that is between the charging current, respectively discharging set current below a temperature threshold and the charging, respectively discharging set current above the temperature threshold, if the temperature is within a temperature transition interval. Thereby, the temperature transition interval may adjoinedly extend below the temperature threshold, and may exhibit a first temperature width ($\delta 1$). Thereby, in particular, the first temperature width ($\delta 1$) may not be greater than the width of the temperature interval extending from the temperature threshold to lower temperatures.

Alternatively, respectively additionally thereto, step (3) may further comprise:
regulating the charging, respectively discharging set current of the at least one galvanic cell to an interim value that is between the charging, respectively discharging set current above a temperature threshold and the charging, respectively discharging set current below the temperature threshold, if the temperature is within a temperature transition interval. Thereby, the temperature transition interval may adjoinedly extend above the temperature threshold, and may exhibit a second temperature width ($\delta 2$). Thereby, in particular, the second temperature width ($\delta 2$) may not be greater than the width of the temperature interval extending from the temperature threshold up to higher temperatures.

Further preferred embodiments are illustrated in the attached drawings.

Figure 1:
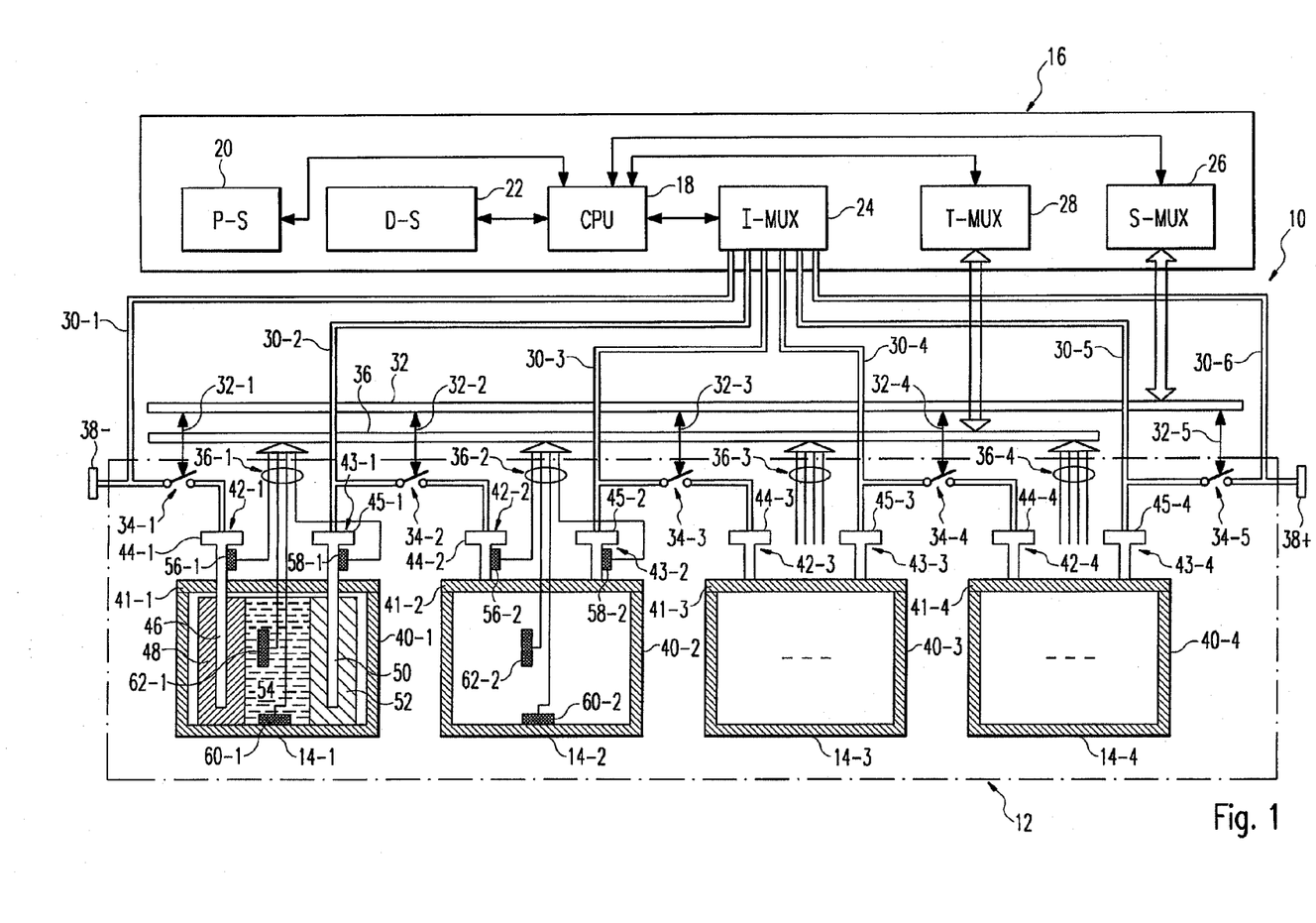
FIG. 1 shows a schematic block diagram of a facility operating according to galvanic principles according to the invention.

FIG. 1 shows a schematic block diagram of a facility 10 operating according to galvanic principles according to the invention. The facility 10 comprises an accumulator 12 having a plurality, in the example four, galvanic cells 14-1, 14-2, 14-3, 14-4, and the accumulator terminals 38 (38+, 38−) as well as an operating management system 16.

The operating management system 16 comprises the following: A central processing unit (CPU) 18, a program storage unit (P-S) 20 for storing algorithms, respectively calculation specifications for the processing of the facility 10 in the form of programs and sub-programs, a data storage unit (D-S) 22 for the storage of parameters for the characterization of an electric operating condition of the facility, and the time-dependencies of these parameters for characterizing the operation history of the facility, a facility for the switch of the current, respectively multiplexer (I-MUX) 24 for the targeted, respectively cell-specific application of a charging current to a respective galvanic cell 14-1, 14-2, 14-3, 14-4 via a corresponding current conductor 30-1, 30-2, 30-3, 30-4, respectively 30-5, a facility for the switch of a signal of the current switch, respectively multiplexer (T-MUS) 26 for multiplexing and transferring current switch signals between the facility for the switch of the current switch and respective facilities for the switch of current 34-1, 34-2, 34-3 and 34-4 that are attributed to the galvanic cells 14-1, 14-2, 14-3, 14-4, as well as a facility for measuring the temperature of the signal switch, respectively multiplexer (T-MUX) 28 for the targeted, respectively addressable addressing of temperature measurement units 56, 58, 60, 62 and for the recording, respectively transferring of temperature measurement signals that are displayed by the temperature sensors 56, 58, 60, 62 via respective temperature measurement signal lines 36 connecting the temperature sensors and the switch facility 28 for measuring the temperature signals.

The accumulator 12 comprises at least one, two, three, in the present example four or more galvanic cells 14-1, 14-2, 14-3, 14-4, which are electrically connected to each other in serial, respectively parallel connection, in order to provide a desired total voltage, respectively a desired total capacity (total discharging current) at the terminals 38+, 38− of the accumulator. For this, the galvanic cells 14-1, 14-2, 14-3, 14-4 of the accumulator 12 have essentially the same construction.

In the embodiment presented in FIG. 1, four galvanic cells 14-1, 14-2, 14-3, 14-4 are connected in series such that between the terminals 38+, 38− of the accumulator 12 the four-fold of a single-voltage of a galvanic cell is provided as total voltage of the accumulator 12. In an electric serial connection of galvanic cells, the output voltages of the individual cells add to the total voltage of the galvanic cells being connected in a serial connection. In a parallel connection of galvanic cells, the capacities (respectively discharging currents) of the galvanic cells being connected in parallel add to a total capacity, (respectively to a total discharging current) corresponding to the number of the galvanic cells being connected in parallel. It is also possible to connect several arrangements of galvanic cells being connected one after the other, respectively being connected in series, respectively, to a parallel connection, and thus to obtain as total voltage a multitude of the single voltage of a galvanic cell, and as total capacity a multitude of the single capacity of a galvanic cell.

A respective galvanic cell 14-1, 14-2, 14-3, 14-4 comprises a cell housing 40, a cell housing cover 41, a negative electrode, respectively cathode 42, comprising a cathode terminal 44, a cathode current conductor 46, a cathode active layer 48, a positive electrode, respectively anode 43 comprising an anode terminal 45, and anode current conductor 50, and an anode active layer 52, a separator comprising electrolyte 54 for making an electrochemical operative connection between the cathode active layer 48 and the anode active layer 52, as well as at least a temperature sensor that is selected from a group comprising the following: a sensor 56 for measuring a temperature of cathode 44, a sensor 58 for measuring a temperature of anode 45, a sensor 60 for measuring a temperature of the electrolyte 54, a sensor 62 for measuring a temperature of the galvanic cell. The sensor 56 for measuring the cathode temperature is in heat-conducting communication with the current conductor 46 and the active layer 48 of the electrode, and is arranged at a portion of the cathode terminal 44 protruding from the cell housing cover 42. The thus arranged cathode temperature sensor 56 measures a temperature being representative for the cathode. The anode temperature sensor 58 is in heat-conducting communication with the current conductor 50 and the active layer 52 of the anode, and is arranged at a portion of the anode terminal 45 protruding from the cell housing cover 42. The thus arranged anode temperature sensor 58 measures a temperature being representative for the temperature of the anode 43. The electrolyte temperature sensor 60 is in the interior of the housing 40 in heat-conducting communication with electrolyte 54, and is arranged as far as possible both from the cathode and the anode, preferably in the same distance from anode 43 and cathode 42, in particular at the bottom of the housing 40 in the embodiment shown in FIG. 1. The electrolyte temperature sensor 60 measures a temperature, which is representative for the temperature of the electrolyte. The cell temperature sensor 62 is arranged in heat-conducting communication with galvanic cell 17, in particular in the embodiment shown in FIG. 1 at an outer side of the housing 40, and preferably essentially in the same distance to anode 43 and cathode 42. The cell temperature sensor 62 is not in heat-conducting communication with one of the electrodes 42, respectively 43 or electrolyte 54, however measures an averaged temperature, which is representative for the cell.

A respective temperature sensor being arranged in the galvanic cell 14-1, that is the cathode temperature sensor 56-1, the anode temperature sensor 58-1, the electronic temperature sensor 60-1, and the cell temperature sensor 62-1 is connected via a respective temperature measurement signal line 36-1, 36-2, 23-3, 36-4 to the temperature measurement signal switch 28 of the operation management system 16. A respective signal generated by one of the temperature measurement sensors 56, 58, 60, 62 is an electric voltage or an electric current, which is/are transferred via a suitable analogue-to-digital converter (not shown) to a digital signal and is transferred via the temperature measurement signal-multiplexer 28 to the central control unit 18. There, the measurement signal is converted to a temperature value and may be stored within a data storage unit 22 for the later analysis. The analogue-to-digital converter (not shown) for the temperature measurement signals may be integrally provided within the temperature sensors 56, 58, 60, 62, or in the temperature measurement signal switch facility 28, or may be separately provided.

For the more precise thermal characterization of a respective galvanic cell 14-1, 14-2, 14-3, 14-4, a respective cell may not only comprise one, but also several sensors being arranged at different positions, respectively being in heat-conducting communication with different elements of the galvanic cell, in particular of the above-mentioned types 56, 58, 60 and 62. To a respective galvanic cell 14-1, 14-2, 14-3, 14-4, a group of temperature measurement signals lines 36-1, 36-2, 36-3, 36-4 is attributed, which are in electrically conducting connection with the temperature measurement signal switch unit 28 by means of a bus system 36.

By means of the current multiplexer 24, the charging current of a respective galvanic cell 14-1, 14-2, 14-3, 14-4 may be applied individually, in groups or collectively onto a single galvanic cell, a selected group of galvanic cells or the entirety of the galvanic cells. Thereby, the cathode terminal 44-1 of cathode 42-1 of a first galvanic cell 14-1 is connected via a current conductor to an external terminal 38, more precise to the negative terminal 38− of accumulator 12, and via a current line 30-1 being switchable by means of a current switch facility 34-1 to a current switch facility 24. The anode terminal 45-1 of the first galvanic cell 14-1 is connected via a current line being switchable by means of a current switch facility 34-2 to cathode terminal 44-2 of the second galvanic cell 14-2, and via a current line 30-2 to current switch facility 24. The anode terminal 45-2 of the second galvanic cell 14-2 is connected via a current line being switchable by means of the current switch facility 34-3 to cathode terminal 44-3 of the third galvanic cell 14-3, and via a current line 30-3 to current switch facility 24. The anode terminal 45-3 of the third galvanic cell 14-3 is connected via a current line being switchable by means of the current switch facility 34-4 to cathode terminal 44-4 of the fourth galvanic cell 14-4, and via a current line 30-4 to the current switch facility 24. Finally, cathode terminal 44-4 of the fourth galvanic cell 14-4 is connected via a current line being switchable by means of the current switch facility 34-5 to anode terminal 38+ of accumulator 12, and via a current line 30-5 to the current switch facility 24.

A respective current measurement unit 34-1, 34-2, 34-3, 34-4, 34-5 is connected by means of a current switch signal line 32-1, 32-2, 32-3, 32-4, respectively 32-5 to the current switch signal switch unit 26, and is targetedly switchable between a closed, respectively current-conducting condition and an open, respectively condition interrupting the current.

If, for example, the current switch unit 34-1 is switched by means of the current signal switch line 32-1 to a closed condition, and the current switch unit 34-2 is switched via the current signal switch line 32-2 to an opened condition, then a charging current for the first galvanic cell 14-1 by means of suitable corresponding switch, respectively addressing via the current switch unit 24 may be targetedly applied, and may be regulated with regard to the strength via the current line 30-2 through the galvanic cell 14-1, and the current line 30-1 of the first galvanic cell 14-1. If the current switch unit 34-3 is switched via the current switch signal line 32-3 to an opened condition and the current switch unit 34-2 is switched via the current switch signal line 30-2 to a closed, respectively current-conducting condition, then a charging current for the second galvanic cell 14-2 by means of suitable addressing and switch by means of the current switch unit 24 via the current line 30-2, and by means of the current switch unit 34-2 to the cathode terminal 44-2 of the second galvanic cell 14-2, via the second galvanic cell 14-2, the anode terminal 45-2 thereof and the current line 30-3, may be targetedly applied, and may be regulated with regard to the strength of the second galvanic cell 14-2. In a respective manner, for a respective galvanic cell, the charging current may be targetedly addressed and may be regulatedly applied with regard to strength. By means of a suitable addressing of the current switch control units 34-1 to 34-5, a charging current may also be targetedly applied in series by means of 2, 3 or all galvanic cells, in particular four galvanic cells 14-1, 14-2, 14-3, 14-4 shown in FIG. 2.

The applied charging currents, the galvanic cells having been applied therewith, and the points in time may be recorded and may be stored in the data storage unit 22 for characterizing the charging history of the individual galvanic cells.

If all current switch units 34-1 to 34-5 are in a closed, respectively current-conducting condition, then between terminals 38' and 38'+ of accumulator 12, a total discharging current of the galvanic cells may be provided. The discharging current may be recorded by means of suitable measurement devices, and may be stored together with the respective measurement points for recording the discharge history also in data storage unit 22.

Similarly, the individual galvanic cells or groups of galvanic cells may be targetedly applied with a charging current, for selected galvanic cells or groups of galvanic cells the electric capacity, the electric voltage being measurable between the two terminals in the open-circuit operation or in a load-dependent terminal voltage, the internal resistance with which the galvanic cell is afflicted, the already charged or available electric charge of the selected cell or group of cells, leaking currents between the terminals within the galvanic cell or from cell to cell in the selected group of cell, can be measured and may be recorded together with the respective measurement points, and may be stored in the data storage unit 22 of the operating management system 16 for the subsequent analysis. In this manner, the history of the electric operating conditions of the accumulator 12 including the electric operating condition in a respective galvanic cell 14-1 to 14-4 may be recorded within the accumulator 12 by means of the operating management system 16.

From the recorded charging, respectively discharging histories, derived figures that are known to the person skilled in the art such as the actual charging condition (State of Charge, SOC) and actual health condition (State of Health, SOH) may be calculated. In the latter, for example the calendaric aging as well as a total discharge or overload that have occurred during the operating period characterizing the general (health) condition of a galvanic cell may be taken into account, and this may also be used for the control of the electric operating condition.

Figure 2:
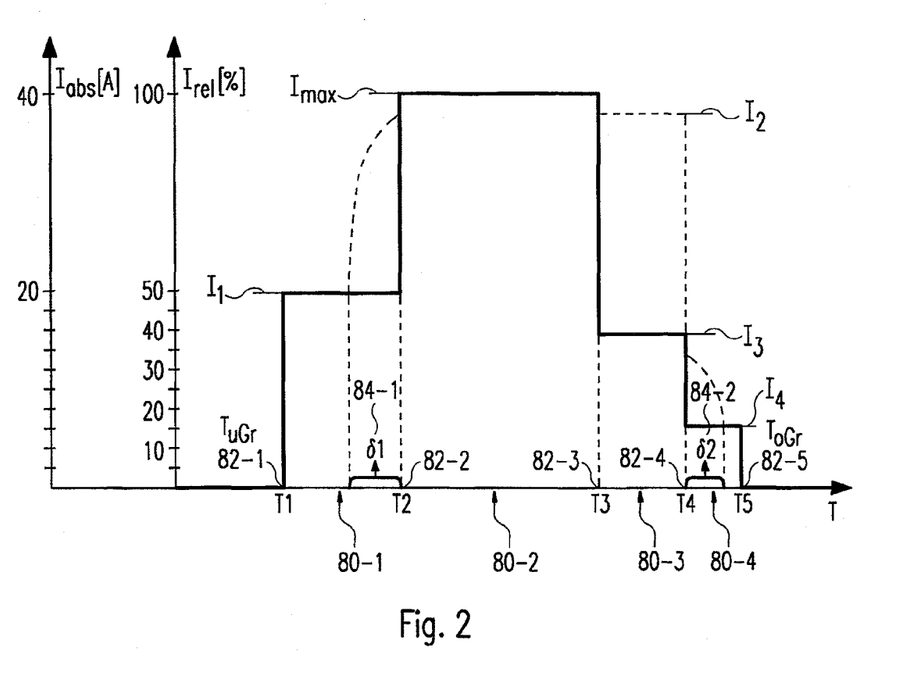
FIG. 2 shows a schematic graphic view of a temperature-dependent charging current regulation according to the invention.

FIG. 2 schematically shows an example for the temperature-dependent control of the electric operating condition, more precise for a parameter of the electric operating condition, that is, in particular, for example, the charging current of the accumulator 12. The temperature-dependent regulation of the charging current being described in the following may be used for a respective galvanic cell, selected groups of galvanic cells or for the entirety of the galvanic cells. Such a temperature-dependent control may also be used, for example, for the discharging currents of individual galvanic cells, of selected groups of galvanic cells or for the entirety of the galvanic cells.

As shown in FIG. 2, an admissible range of the operating temperature of the galvanic cells of the accumulator is divided by means of temperature thresholds T1 (82-1), T2 (82-2), T3 (82-3), T4 (82-4) and T5 (82-5) into several temperature intervals. The temperature threshold T1 (82-1) is at the same time the lower temperature threshold $T_{uGr}$ of the admissible range of the operating temperature of the galvanic cells. The temperature threshold T5 (82-5) is at the same time the upper limit $T_{oGr}$ for the admissible range of operating temperatures. Accordingly, the system for the operating management 16 effects that for temperatures below the lower and above the upper temperature limit $T_{uGr}$, respectively $T_{oGr}$, the charging current is essentially zero, respectively that the galvanic cells may not be operated (charged or discharged). For this, the operating management system 16 may effect that the terminals 38+, 38– of the accumulator 12 with customer loads connected thereto may be separated by switching the current switch units 34-1 and 34-5 into a condition that does not conduct current.

Within a medium temperature interval in the admissible operating temperature range, in particular as shown in FIG. 2 within the temperature interval between the second temperature threshold T2 (82-2) and the third temperature threshold T3 (82-3), the maximum value for the charging current of a respective galvanic cell is limited to a maximum admissible, respectively applicable charging $I_{max}$. This is foreshadowed in FIG. 2 thereby that the value $I_{max}$ for the charging current within the second temperature interval 80-2 between the second temperature threshold T2 (82-2) and the third temperature threshold T3 (82-3) is set to 100% on the relative current scale "$I_{rel}$". On the absolute current scale "$I_{abs}$" shown in FIG. 2, this corresponds to a charging current of e.g. 40 Ampere for an accumulator, respectively a group of galvanic cells being correspondingly connected in series and in parallel.

Within the first temperature interval 80-1 between the first temperature value T1 (82-1) and the second temperature threshold T2 (82-2), the set value $I_1$ for the charging current is set to a lower value, essentially to 50% of the maximum charging current value $I_{max}$ for the second temperature interval 80-2.

In the third temperature interval 80-3 between the third temperature threshold T3 (82-3) and the fourth temperature threshold T4 (82-4), the value $I_3$ for the charging current is set to 90% of the maximum value (100%) of the charging current in the second temperature interval (80-2). Instead of the predetermined set value $I_3$, the charging current within the third temperature interval 80-3 may be limited in dependence on the time-dependent course of the electric operating condition, in particular the charging, respectively health condition of the galvanic cells, also to a range between a lower charging current value (in FIG. 2: 40% of $I_{max}$) and an upper limit, in particular the charging current value $I_3$ (in FIG. 2: 90% $I_{max}$). In a similar manner, also in other temperature intervals, e.g. in the temperature interval 80-1 and the temperature interval 80-4, with exception of temperature interval 80-2, in which the maximum charging current set value $I_{max}$ (100%) is predetermined, lower limits and upper limits for the charging current may be defined.

In a fourth temperature interval 80-4 between the fourth temperature threshold T4 (82-4) and the fifth temperature threshold T5 (82-5), the charging current is set to a fourth charging current value $I_{max}$ (in FIG. 2, for example, 15% $I_{max}$), which is less than the upper charging current value $I_3$ within the third temperature interval 80-3.

For the protection of the electrodes, in particular the anode, for temperature thresholds, where according to the regulation instruction as discussed above, a switch, respectively a discontinuity of the predetermined charging current occurs, a temperature transition interval is set in which the charging current is regulated to interim values between the charging current values for temperatures above the concerned temperature threshold and charging current values for temperatures below the concerned temperature threshold. In FIG. 2, for example, a first temperature transition interval 84-1 is shown having a temperature width δ1, which adjoins the second temperature threshold T2 (82-2) below, and a second temperature transition interval 84-2 having a temperature width δ2, which adjoins the temperature threshold T4 (82-4) above. In the first, respectively the second temperature transition interval 84-1, respectively 84-2, one or several interim values for the charging current are set between the charging current value below the concerned temperature threshold and the charging current value above the concerned temperature threshold, as is indicated in FIG. 2 by the curved dashed lines in the temperature transition intervals 84-1 and 84-2.

Figure 3:
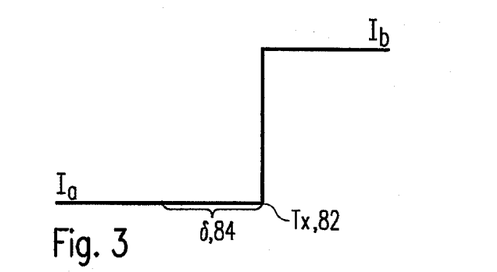
FIG. 3 shows a schematic representation of a set charging current having an abrupt change of a galvanic cell at a temperature threshold.
Figure 3A:
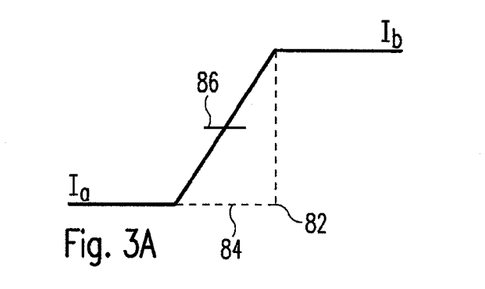
FIG. 3A is a first schematic presentation of a continuous transition of a set charging current within a temperature transition interval at a temperature threshold according to the invention.
Figure 3B:
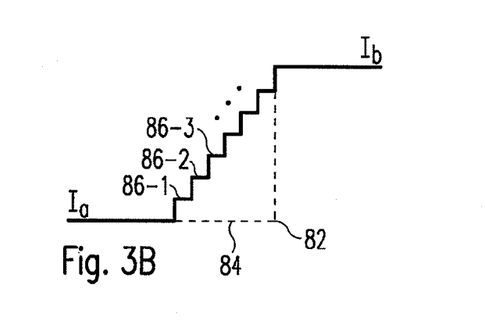
FIG. 3B is a second schematic representation of a continuous transition of a set charging current within a temperature transition interval at a temperature threshold according to the invention.
Figure 3C:
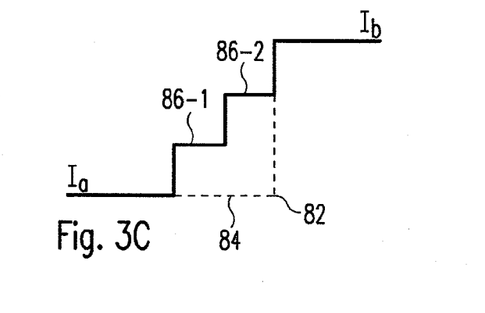
FIG. 3C is a third schematic representation of a continuous transition of a set charging current within a temperature transition interval at a temperature threshold according to the invention.
Figure 3D:
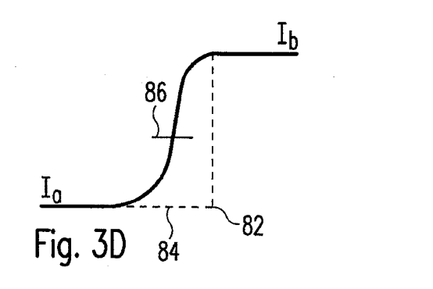
FIG. 3D is a fourth schematic representation of a continuous transition of a set charging current within a temperature transition interval at a temperature threshold according to the invention.
Figure 3E:
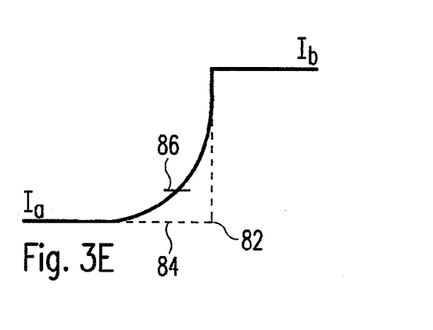
FIG. 3E is a fifth schematic representation of a continuous transition of a set charging current within a temperature transition interval at a temperature threshold according to the invention.
Figure 3F:
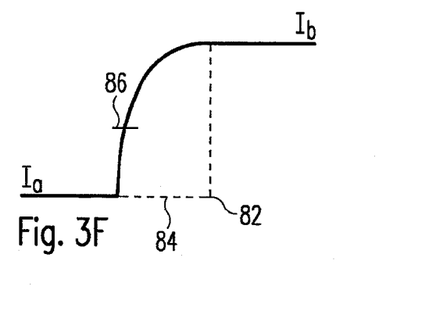
FIG. 3F is a sixth schematic representation of a continuous transition of a set charging current within a temperature transition interval at a temperature threshold according to the invention.

FIG. 3 schematically shows a discontinuity, respectively a switch, occurring at a temperature threshold Tx (82) between a charging set value $I_a$ within a temperature interval below a temperature threshold Tx (with x=1, 2, ... 5), and a charging current value $I_b$ within a temperature interval, which adjoins a temperature threshold Tx above, and a temperature transition interval 84 having a temperature width δ being attributed to the temperature threshold Tx, which adjoins below as shown in the example of FIG. 3. The FIGS. 3A to 3F show different examples in which manner in the temperature transition interval 84 at least an interim value 86, respectively two (86-1, 86-2) or several interim values can be set. FIG. 3A shows that the control current set value within the temperature transition interval 84 from the control current set value $I_a$ changeably switches at a (in FIG. 3a left) end of the transition interval 84 continuously and linearly with the temperature over to the set value $I_b$ within the temperature interval at the other (in FIG. 3A right) end of the transition interval 84, respectively above the temperature threshold Tx. FIG. 3B shows that within the transition interval 84 the set value in the graphic presentation switches in a staircase-shaped manner via several interim values 86-1, 86-2, 86-3 ... from a control value $I_a$ over to a control value $I_b$. FIG. 3C shows that the set value in simplification of the control instruction of FIG. 3B, switches over via two interim values 86-1, 86-2 from the set value $I_a$ to the set value $I_b$. FIG. 3D shows that the control set value within the transition interval 84 continuously switches over in a temperature dependency that is S-shaped in a graphic presentation from control set value $I_a$ at one end to control set value $I_b$ at the other end of the transition interval 84. FIG. 3E shows that the set value within the transition interval 84 continuously and monotonically increasingly switches over in the graphic presentation in a right-curved curve from the control set value $I_a$ to the control set value $I_b$.

In FIG. 3 and FIGS. 3A to 3D, the transition interval 84 is shown adjoining the temperature threshold Tx below. However, it may also adjoinedly extend above the temperature threshold Tx, as is exemplarily shown in FIG. 2 for the temperature transition interval 84-2, which adjoins the fourth temperature threshold T4 (82-4) above.

In the preceding description of the control instructions shown in FIG. 2 and FIGS. 3, 3A to 3F, the control value exemplarily was a control current value. This, in general, may be a control current value for an individual, arbitrarily selected galvanic cell, a selected group of galvanic cells, or also collectively for the entirety of the galvanic cells. The control instruction in FIGS. 2 and 3A to 3F may also be applied to a discharging current, wherein the current values then present current limitations for the discharging current. The control instructions in FIGS. 2 and 3A to 3F may also be applied to charging voltages and discharging voltages.

In the FIGS. 3, 3A to 3F, a temperature transition interval 84 has a temperature width δ that is less than the width of the temperature interval in which the temperature transition interval extends. However, it is also possible to determine the width δ of the temperature transition interval 84 equal to the width of the temperature interval in which the transition interval 84 extends. In this manner, a continuously determined, temperature-dependent control instruction may be realized extending over one or several temperature intervals, and finally even extending over the total admissible operating temperature range.

The temperature interval limits and the respective parameters to be temperature-dependently regulated within the set temperature dependencies (control instructions) within the temperature intervals for the control values for the electric operating condition of a respective cell according to the invention, are deposited in a storage unit, in particular in the data storage unit 22 of the operating management system 16, and may be adapted by suitable software updates to a respective accumulator type, or also to a defined operating condition history.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE NUMERALS 10 facility operating according to galvanic principles
12 accumulator
14-1, 14-2, 14-3, . . . galvanic cell
16 operating management system
18 central processing unit (CPU)
20 program storage unit
22 data storage unit
24 current multiplexer
26 current switch signal-multiplexer
28 temperature measurement signal-multiplexer
30-1, 30-2, 30-3, . . . current line
32, 32-1, 32-2 . . . current switch signal line
34-1, 34-2, 34-3, . . . current switch unit
36, 36-1, 36-2, . . . temperature measurement signal line
38, 38+, 38− accumulator terminal
40, 40-1, 40-2, . . . cell housing
41, 41-1, 41-2, . . . cell housing cover
42, 42-1, 42-2, . . . cathode
43, 43-1, 43-2, . . . anode
44, 44-1, 44-2, . . . cathode terminal
45, 45-1, 45-2, . . . anode terminal
46 cathode current conductor
48 cathode active layer
50 anode current conductor
52 anode active layer
54 separator with electrolyte
56-1, 56-2, . . . cathode temperature sensor
58-1, 58-2, . . . anode temperature sensor
60-1, 60-2, . . . electrolyte temperature sensor
62-1, 62-2, . . . cell temperature sensor
80-1, 80-2, . . . temperature interval
82-1, 82-2, . . . temperature threshold
84, 84-1, 84-2 temperature transition interval
86, 86-1, 86-2 interim value

What is claimed is:

1. A facility which operates according to galvanic principles, wherein the facility comprises at least one galvanic cell and an operating management system for monitoring and controlling a discharging current of the facility and for monitoring a representative temperature of the facility, the facility comprising a first temperature threshold T1, a second temperature threshold T2 which is greater than T1, a third temperature threshold T3 which is greater than T2, and a fourth temperature threshold T4 which is greater than T3, and wherein the operating management system is designed:

to limit a discharging set current of the at least one galvanic cell within a temperature interval between T2 and T3 to a maximum discharging current value $I_{max}$, to limit a discharging set current of the at least one galvanic cell within a temperature interval between T1 and T2 to a first discharging current value $I_1$ which is lower than $I_{max}$, and to limit a discharging set current of the at least one galvanic cell within a temperature interval between T3 and T4 to a second discharging current value $I_2$ which also is lower than $I_{max}$.

2. The facility of claim 1, wherein the facility comprises two or more galvanic cells.

3. The facility of claim 1, wherein the operating management system is further designed:

to limit a discharging set value of the at least one galvanic cell within the temperature interval between T3 and T4 to a third, minimal discharging current value $I_3$ so that the discharging current within said temperature interval is not lower than $I_3$ and not higher than $I_2$.

4. The facility of claim 3, wherein the facility comprises a fifth temperature threshold T5 that is greater than T4, and wherein the operating management system is designed to limit the discharging set current $I_4$ of the at least one galvanic cell within a temperature interval between T4 and T5 to a fourth discharging current $I_4$ which is lower than $I_2$.

5. The facility of claim 1, wherein $I_1$ is in the range of from 30% $I_{max}$ to 90% $I_{max}$.

6. The facility of claim 1, wherein the operating management system is designed to regulate the discharging set current as a function of temperature continuously between a discharging set current within a temperature interval below a temperature threshold T1, T2, T3 or T4 and a discharging set current above the temperature threshold T1, T2, T3 or T4 if the temperature is within a temperature transition interval.

7. The facility of claim 1, wherein the facility comprises at least one temperature measurement unit for measuring a temperature of the facility.

8. The facility of claim 7, wherein the at least one temperature measurement unit comprises at least one sensor, at least one associated sensor transferring signal means, and at least one signal analyzing unit.

9. The facility of claim 7, wherein the temperature of the facility is a temperature that is representative for an electrode.

10. The facility of claim 9, wherein the electrode is a cathode.

11. The facility of claim 9, wherein the electrode is an anode.

12. The facility of claim 7, wherein the temperature of the facility is a temperature that is representative for a means for generating an electric operative connection between electrodes.

13. The facility of claim 12, wherein the means comprises an electrolyte.

14. The facility of claim 7, wherein the temperature of the facility is a temperature that is representative for a current conductor of an electrode.

15. The facility of claim 14, wherein the electrode is a cathode.

16. The facility of claim 14, wherein the electrode is an anode.

17. The facility of claim 1, wherein the facility comprises at least one lithium-ion cell.

18. The facility of claim 1, wherein the facility is an accumulator comprising a plurality of galvanic cells.

19. The facility of claim 1, wherein the facility comprises at least four galvanic cells.

20. A method for monitoring and controlling an electric operating condition of a facility that operates according to galvanic principles and comprises at least one galvanic cell, wherein the method comprises:
(1) monitoring a discharging current of the facility,
(2) monitoring a temperature of the facility, and
(3) controlling the discharging current of the facility as a function of the temperature, which controlling comprises defining a first temperature threshold T1, a second temperature threshold T2 that is greater than T1, a third temperature threshold T3 that is greater than T2, and a fourth temperature threshold T4 that is greater than T3, limiting a discharging set value of the at least one galvanic cell within a temperature interval between T2 and T3 to a maximum discharging current value $I_{max}$, limiting a discharging set current of the at least one galvanic cell within a temperature interval between T1 and T2 to a first discharging current value $I_1$ that is lower than $I_{max}$, and limiting a discharging current value of the at least one galvanic cell within a temperature interval between T3 and T4 to a second discharging current value $I_2$ that also is lower than $I_{max}$.

21. The method of claim 20, wherein (3) further comprises regulating the discharging set current as a function of temperature continuously between a discharging set current within a temperature interval below a temperature threshold T1, T2 T3 or T4 and a discharging set current above the temperature threshold T1, T2, T3 or T4 if the temperature is within a temperature transition interval.

22. The method of claim 20, wherein (2) comprises using at least one temperature measurement unit for measuring a temperature of the facility.

23. The method of claim 22, wherein the temperature of the facility is a temperature that is representative for an electrode.

24. The method of claim 23, wherein the electrode is a cathode.

25. The method of claim 23, wherein the electrode is an anode.

26. The method of claim 22, wherein the temperature of the facility is a temperature that is representative for a means for generating an electric operative connection between electrodes.

27. The method of claim 26, wherein the means comprises an electrolyte.

28. The method of claim 22, wherein the temperature of the facility is a temperature that is representative for a current conductor of an electrode.

29. The method of claim 28, wherein the electrode is a cathode.

30. The method of claim 28, wherein the electrode is an anode.

31. The method of claim 20, wherein (3) further comprises:
defining at least one of a lower temperature threshold ($T_{uGr}$) and an upper temperature threshold ($T_{oGr}$),
effecting that the facility is not operated if a temperature of the at least one galvanic cell is below the lower temperature threshold ($T_{uGr}$) or above the upper temperature threshold ($T_{oGr}$).

32. The method of claim 20, wherein (3) further comprises controlling the electric operating condition of the facility also as a function of a representative parameter which is determined by an operating management system for at least one of a charging condition and a health condition of the facility.

33. The method of claim 32, wherein the parameter is representative for at least one of a charging condition and a health condition of the at least one galvanic cell.

34. The method of claim 20, wherein the facility is an accumulator comprising a plurality of galvanic cells.

35. The method of claim 20, wherein the facility comprises at least four lithium-ion cells.

* * * * *